United States Patent Office 2,697,099
Patented Dec. 14, 1954

2,697,099

2-(BETA-CARBOXY-ALPHA- OR BETA-THIOL-PROPIONAMIDO) BENZOTHIAZOLES AND PROCESS

Edward B. Knott, Harrow, England, assignor to Eastman Kodak Company, Rochester, N. Y., a corporation of New Jersey No Drawing. Application April 30, 1952,
Serial No. 285,302

5 Claims. (Cl. 260—305)

This invention relates to new 2-substituted benzothiazole compounds.

The new compounds of my invention comprise those selected from the following two general formulas:

I 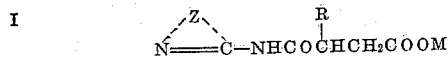

II 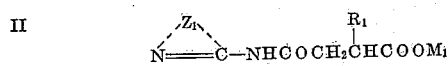

wherein R and $R_1$ each represents a member selected from the group consisting of a thiol group (—SH) and an acetylthiol group ($CH_3COS$—), M and $M_1$ represents a hydrogen atom or an alkali metal atom, e. g. sodium, potassium, etc., and Z and $Z_1$ each represents the non-metallic atoms necessary to complete a heterocyclic nucleus of the benzothiazole series.

The compounds of Formula I above wherein R represents an acetylthiol group can advantageously be prepared by condensing maleic anhydride and a 2-aminobenzothiazole together in substantially equimolar amounts followed by heating the resulting amide together with thioacetic acid. Typical aminobenzothiazole compounds which can advantageously be employed in the above condensation comprise those represented by the following general formula:

III 

wherein Z has the values defined above. Typical 2-aminobenzothiazole compounds include, for example, the following: 2-amino - 5 - bromobenzothiazole, 2-amino-6-bromobenzothiazole, 2-amino-4-chlorobenzothiazole, 2-amino-6-chlorobenzothiazole, 2 - amino-7-chloro-4-methoxybenzothiazole, 2-amino-4-methoxybenzothiazole, 2-amino - 5 - methoxybenzothiazole, 2-amino - 6 - methoxybenzothiazole, 2-amino-6-ethoxybenzothiazole, 2-amino-4-n-butoxybenzothiazole, 2 - amino-6-isobutoxybenzothiazole, 2-amino-4-methylbenzothiazole, 2-amino-6-methylbenzothiazole, etc. The amides produced by condensing the compounds of Formula III with maleic anhydride can be represented by the following general formula:

IV 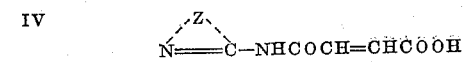

wherein Z has the values defined above. The compounds of Formula IV are generally obtained in the form of an acid-addition salt with the compounds of Formula III. The free acid can be obtained by acidifying the reaction mixture with a mineral acid. The alkali metal forms of the compounds of Formula I can be obtained by neutralizing the free acid with an alkali, e. g. sodium hydroxide, potassium hydroxide, etc.

The compounds of Formula II wherein $R_1$ represents an acetylthiol group can be obtained by condensing a compound having the following formula:

V 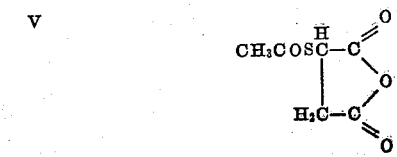

with a 2-aminobenzothiazole compound selected from those having the following general formula:

VI 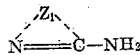

wherein $Z_1$ has the values given above. The compound of Formula V can be prepared by condensing thioacetic acid together with maleic anhydride according to the method of Holmberg and Schjanberg—"Archiv. Kemi. Min. Geol." (1940), vol. 14A, 22. The compounds of Formulas I and II wherein R and $R_1$ each represents a thiol group can be prepared by hydrolyzing the acetylthiol compounds of Formulas I and II in the presence of aqueous alkali. Alternatively, the compounds of Formula I wherein R represents a thiol group can be prepared by condensing a compound selected from those represented by Formula IV above with thioacetic acid in the presence of aqueous alkali.

Still another method of preparing the compounds of Formulas I and II wherein R and $R_1$ each represents a thiol group comprises hydrolyzing in the presence of strong ammonia a compound selected from those represented by the following two general formulas:

VII 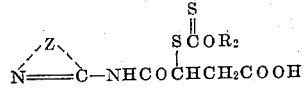

and

VIII 

wherein Z and $Z_1$ have the values given above and $R_2$ represents an alkyl group, e. g. methyl, ethyl, n-butyl, n-octyl, etc. Compounds selected from those represented by Formulas VII and VIII are described in my copending application Serial No. 285,301, filed on even date herewith.

Typical 2-aminobenzothiazole compounds embraced by Formula VI above comprises the 2-aminobenzothiazole compounds listed above under Formula III.

The following examples will serve to illustrate the manner whereby I prepare the new benzothiazole compounds of my invention.

*Example 1.—2-(β-carboxyacrylamido)benzothiazole*

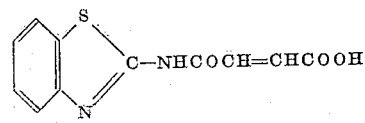

30.0 g. of maleic anhydride, 90.0 g. of 2-aminobenzothiazole, and 500 cc. of ethyl acetate were heated together with stirring on the steam bath for 15 minutes. A yellow, thick meal separated, which was collected after chilling, and washed with ethyl acetate. This product represented the 2-aminobenzothiazole addition salt of the compound having the above formula, and was obtained in a yield of 120.0 g. It formed flat, pale yellow needles, M. P. 189° C. on recrystallization from acetone.

The free acid was obtained by suspending the above salt (10.0 g.) in 50 cc. of ethanol, and adding a solution of concentrated hydrochloric acid (3 cc.) in water (7 cc.), stirring and heating for 10 to 15 minutes on the steam bath until the yellow suspension became colorless. The suspension was then diluted with water, and the precipitate was collected on a filter and washed with water to give 6.2 g. of air-dried material. On recrystallization from acetic acid, it formed pale yellow crystals having a M. P. of 179° C.

*Example 2.—2-(α-acetylthiol - β - carboxypropionamido) benzothiazole*

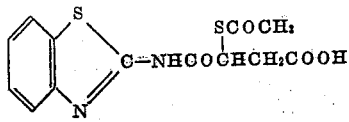

2.5 g. of the free acid (or 4.0 g. of the 2-aminobenzothiazole salt) obtained in Example I, 0.9 cc. of thioacetic acid, and 10 cc. of acetic acid were heated with stirring on the steam bath for 10 minutes. The thick, white meal was slurried in 20 cc. of ethanol, collected on a filter and washed with the same solvent. The yield of crude product was 3.05 g. and it melted at 209° C. The product was crystallized from dioxane-water as fine satin-like crystals, M. P. 213° C. with decomposition.

Instead of using acetic acid as a solvent in the above example, other solvents can be used, e. g. dioxane, etc., however, the acetic acid seemed to give the best results.

*Example 3.—2-(β-acetylthiol-β-carboxypropionamido)-benzothiazole*

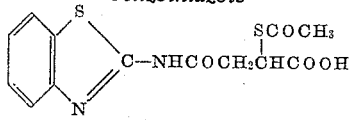

1.7 g. of acetylthiolsuccinic anhydride (obtained by the method of Holmberg, supra), 1.5 g. of 2-aminobenzothiazole, and 10 cc. of ethyl acetate were refluxed together for 5 minutes on the steam bath. The granular precipitate was collected after chilling and washed with ethyl acetate. The yield of crude product was 1.8 g., M. P. 180° C. with decomposition. From aqueous acetone it formed fine, colorless crystals, M. P. 180° C.

*Example 4.—2-(β-carboxyacrylamido) - 6 - ethoxybenzothiazole*

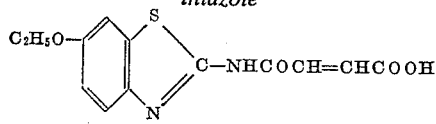

7.6 g. of 2-amino-6-ethoxybenzothiazole, 40.0 g. of maleic anhydride and 40.0 cc. of ethyl acetate were heated together for 5 minutes on the steam bath. The thick yellow green slurry was collected on a filter and washed with ethyl acetate. The 2-aminobenzothiazole addition salt thus obtained weighed 9.6 g. and a sample from acetone formed pale green crystals, M. P. 182° C.

The free acid was obtained by suspending the salt (5.0 g.) in 25 cc. of boiling ethanol, and adding a slight excess of 2N-hydrochloric acid, followed by chilling. It was obtained as a brown powder, M. P. 172° C.

*Example 5.—2-(α-acetylthiol-β-carboxypropionamido)-6-ethoxybenzothiazole*

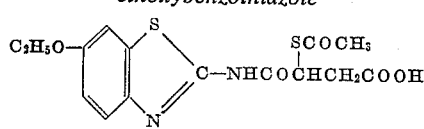

4.8 g. of the 2-amino-6-ethoxybenzothiazole addition salt of the compound obtained in Example 4, 1.7 cc. of thioacetic acid, and 20 cc. of acetic acid were heated together for 10 minutes on the steam bath, giving a thick, white precipitate. The solid (3.5 g.) was collected on a filter and recrystallized from acetone as pale yellow needles, M. P. 194° C.

*Example 6.—2-(β-acetylthiol-β-carboxypropionamido)-6-ethoxybenzothiazole*

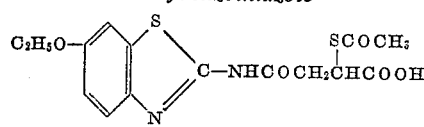

1.9 g. of 2-amino-6-ethoxybenzothiazole, 1.7 g. of acetylthiolsuccinic anhydride, and 20 cc. of ethyl acetate were refluxed together for 5 minutes. The solution was chilled to give a thick slurry. The solid (20 g.) was collected on a filter and recrystallized from aqueous acetone as colorless crystals, M. P. 148° C.

*Example 7.—2-(β-carboxy - α-thiolpropionamido)benzothiazole*

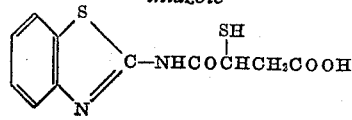

50.0 g. of 2-(β-carboxyacrylamido)benzothiazole were dissolved in a solution of sodium hydroxide (1.8 g.) in water (30 cc.), and 16 cc. of thioacetic acid were added slowly, the mixture being well stirred to redissolve any precipitation. The clear solution of the sodium salts was then stirred rapidly while acetic acid (5 cc.) in water (20 cc.), was slowly dripped in. A pale green gum separated, soon solidified, and the remaining liquid had colorless flocks dispersed therethrough. The lumps were broken up, and the solids collected and washed with water. The yield was 3.65 g. The product was dissolved in aqueous ammonia and precipitated with hydrochloric acid. From aqueous acetone, it formed colorless crystals, M. P. 178°–180° C. (effervescence).

Alternatively, the above product was prepared as follows: 3.25 g. of 2-(α-acetylthiol-β-carboxypropionamido)-benzothiazole were dissolved in a solution of sodium hydroxide (1.6 g.) in water (10 cc.) and set aside for two hours. Water (50 cc.) was added and the whole gradually acidified with dilute hydrochloric acid with vigorous stirring. The white flocks were collected, washed well with water, and recrystallized from aqueous acetone (or aqueous acetic acid). The product was obtained as a white powder, M. P. 178–180° C.

Alternatively, the above product was obtained as follows: 7.4 g. of 2-(β-carboxy-α-thiocarbethoxythiolpropionamido)benzothiazole were dissolved in 50 cc. of strong ammonia (about 35%) and set aside for 16 hours before dilution with 200 cc. of water, and acidification. The product was collected on a filter, washed well with water, and recrystallized from aqueous acetone as a white powder, M. P. 179–180° C.

*Example 8.—2 - (β-carboxy-β-thiolpropionamido)benzothiazole*

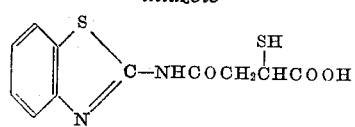

3.2 g. of 2-(β-acetylthiol-β-carboxypropionamido)benzothiazole were dissolved in a solution of sodium hydroxide (1.6 g.) in water (10 cc.) and set aside for 12 hours. Water (25 cc.) was added and the reaction mixture acidified gradually with rapid stirring. The colorless flocks formed a white crystalline powder, M. P. 180–181° C. from aqueous acetone.

*Example 9.—6 - ethoxy - 2 - (β-carboxy - α - thiolpropionamido)benzothiazole*

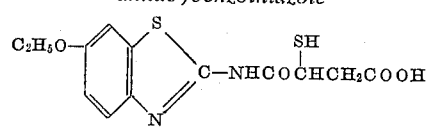

3.7 g. of 2-(α-acetylthiol-β-carboxypropionamido)-6-ethoxybenzothiazole were dissolved in a solution of sodium hydroxide (1.6 g.) in water (10 cc.) and set aside for two hours. The reaction mixture was diluted with 50 cc. of water, followed by gradual acidification to give buff colored flocks which were dissolved in acetone and the solution crystallized. A white powder, M. P. 204° C., crystallized on chilling.

*Example 10.—6 - ethoxy-2-(β-carboxy-β-thiolpropionamido)benzothiazole*

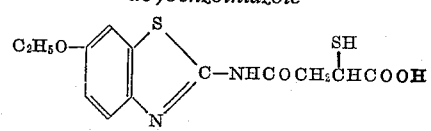

1.8 g. of 2-(β-acetylthiol-β-carboxypropionamido)-6-ethoxybenzothiazole were dissolved in a solution of sodium hydroxide (0.8 g.) in water (5 cc.), and set aside for two hours. Water (25 cc.) was added and the clear solution gradually acidified with stirring. The product formed a colorless, crystalline powder, M. P. 204° C., from acetone.

In like manner, other benzothiazole compounds selected from those represented by Formulas I and II above can be prepared according to my invention.

Compounds of Formulas I and II wherein R and $R_1$ represent an acetylthiol group are useful as antiplumming agents in photographic processes. They can be added directly to the photographic silver halide emulsion, or they can be used in a developing solution, for example. The compounds of Formulas I and II wherein R and $R_1$ each represents a thiol group are particularly useful as antifogging agents and grain growth restrainers in photographic emulsions. When the compounds of Formulas I and II are incorporated in the emulsion, they should be used in amounts from 2.5 grams to 25 grams per unit of silver halide formed from 1000 grams of silver nitrate.

What I claim as my invention and desire secured by Letters Patent of the United States is:

1. A compound selected from the group consisting of those represented by the following two general formulas:

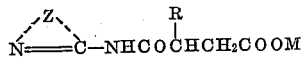

and

wherein R and $R_1$ each represents a thiol group, M and $M_1$ each represents a member selected from the group consisting of a hydrogen atom and an alkali metal atom, and Z and $Z_1$ each represents the non-metallic atoms necessary to complete a heterocyclic nucleus of the benzothiazole series selected from the group consisting of benzothiazole and benzothiazole having substituted thereon a radical selected from the group consisting of bromine, chlorine, methyl, and an alkoxyl group wherein the alkyl group is a primary alkyl group containing from 1 to 4 carbon atoms.

2. The compound having the following formula:

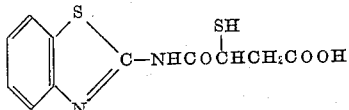

3. The compound having the following formula:

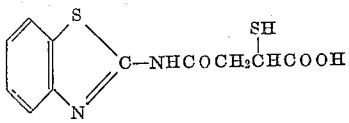

4. A process for preparing a compound selected from those represented by the following general formula:

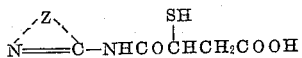

wherein Z represents the non-metallic atoms necessary to complete a heterocyclic nucleus of the benzothiazole series selected from the group consisting of benzothiazole and benzothiazole having substituted thereon a radical selected from the group consisting of bromine, chlorine, methyl, and an alkoxyl group wherein the alkyl group is a primary alkyl group containing from 1 to 4 carbon atoms, comprising hydrolyzing in the presence of aqueous alkali a compound selected from those represented by the following general formula:

wherein Z represents the non-metallic atoms necessary to complete a heterocyclic nucleus of the benzothiazole series selected from the group consisting of benzothiazole and benzothiazole having substituted thereon a radical selected from the group consisting of bromine, chlorine, methyl, and an alkoxyl group wherein the alkyl group is a primary alkyl group containing from 1 to 4 carbon atoms, and acidifying the reaction mixture.

5. A process for preparing a compound selected from those represented by the following general formula:

$$\begin{array}{c} Z_1 \\ N=\!=\!C-NHCOCH_2CHCOOH \end{array} \quad SH$$

wherein $Z_1$ represents the non-metallic atoms necessary to complete a heterocyclic nucleus of the benzothiazole series selected from the group consisting of benzothiazole and benzothiazole having substituted thereon a radical selected from the group consisting of bromine, chlorine, methyl, and an alkoxyl group wherein the alkyl group is a primary alkyl group containing from 1 to 4 carbon atoms, comprising hydrolyzing in the presence of aqueous alkali a compound selected from those represented by the following general formula:

$$\begin{array}{c} Z_1 \\ N=\!=\!C-NHCOCH_2CHCOOH \end{array} \quad SCOCH_3$$

wherein $Z_1$ represents the non-metallic atoms necessary to complete a heterocyclic nucleus of the benzothiazole series selected from the group consisting of benzothiazole and benzothiazole having substituted thereon a radical selected from the group consisting of bromine, chlorine, methyl, and an alkoxyl group wherein the alkyl group is a primary alkyl group containing from 1 to 4 carbon atoms, and acidifying the reaction mixture.

References Cited in the file of this patent

UNITED STATES PATENTS

| Number | Name | Date |
|---|---|---|
| 2,503,861 | Weissberger | Apr. 11, 1950 |